United States Patent
Iwano

(10) Patent No.: US 11,261,923 B2
(45) Date of Patent: Mar. 1, 2022

(54) CLUTCH APPARATUS

(71) Applicant: NSK-WARNER K.K., Tokyo (JP)

(72) Inventor: Akira Iwano, Fukuroi (JP)

(73) Assignee: NSK-WARNER K.K., Tokyo (JP)

(*) Notice: Subject to any disclaimer, the term of this patent is extended or adjusted under 35 U.S.C. 154(b) by 401 days.

(21) Appl. No.: 16/278,004

(22) Filed: Feb. 15, 2019

(65) Prior Publication Data
US 2019/0257375 A1 Aug. 22, 2019

(30) Foreign Application Priority Data
Feb. 19, 2018 (JP) .............................. JP2018-027011

(51) Int. Cl.
| F16D 47/04 | (2006.01) |
| F16D 13/52 | (2006.01) |
| F16D 41/06 | (2006.01) |
| F16D 23/12 | (2006.01) |
| F16D 41/04 | (2006.01) |

(Continued)

(52) U.S. Cl.
CPC ............ *F16D 47/04* (2013.01); *F16D 13/52* (2013.01); *F16D 41/064* (2013.01); *F16D 41/04* (2013.01); *F16D 41/066* (2013.01); *F16D 41/088* (2013.01); *F16D 2021/0676* (2013.01); *F16D 2023/123* (2013.01); *F16D 2041/0606* (2013.01)

(58) Field of Classification Search
CPC .......... F16D 41/04; F16D 41/02; F16D 47/04; F16D 41/064; F16D 41/088; F16D 2041/0606; F16D 2023/123
See application file for complete search history.

(56) References Cited

U.S. PATENT DOCUMENTS 3,087,590 A * 4/1963 Gorsky ................. F16D 41/064
                                                          192/45.019
3,477,302 A * 11/1969 Webb ..................... F16D 13/52
                                                          74/142

(Continued)

FOREIGN PATENT DOCUMENTS

| DE | 10 2015 225 319 A1 | 6/2017 |
| JP | 2005-221062 A1 | 8/2005 |

(Continued)

OTHER PUBLICATIONS

Extended European Search Report dated Aug. 22, 2019, in European Patent Application No. 19157552.1.

*Primary Examiner* — Tinh Dang
(74) *Attorney, Agent, or Firm* — SGPatents PLLC

(57) ABSTRACT

A clutch apparatus comprises a first race, a second race arranged coaxial with and rotatable relative to the first race, and an engagement mechanism provided between the first race and the second race for engagement of the first race and said second race. The engagement mechanism comprising a first clutch allowing rotation of the first race in only one direction, and a second clutch arranged axially adjacent to the first clutch, the second clutch comprising a rotary member that is provided on the second race in a rotatable and axially immovable manner and a movable member that is movable in the axial direction, and a cam mechanism disposed between the rotary member and the movable member, and the movable member being engaged with the first race by being moved in the axial direction by the cam mechanism.

17 Claims, 5 Drawing Sheets

(51) Int. Cl.
    *F16D 41/064*     (2006.01)
    *F16D 21/06*     (2006.01)
    *F16D 41/066*     (2006.01)
    *F16D 41/08*     (2006.01)

(56) References Cited

U.S. PATENT DOCUMENTS

| | | |
|---|---|---|
| 6,343,681 B1 | 2/2002 | Aoki |
| 10,428,880 B2 * | 10/2019 | Trinkenschuh ....... F16D 27/112 |
| 2009/0277738 A1 | 11/2009 | Papania et al. |
| 2014/0326565 A1 | 11/2014 | Iwano et al. |
| 2020/0224733 A1 * | 7/2020 | Kato ........................ F16D 47/00 |

FOREIGN PATENT DOCUMENTS

| | | | | |
|---|---|---|---|---|
| JP | 2009-542990 A | 12/2009 | | |
| WO | WO-2019049231 A | * 3/2019 | ............. | F16D 43/20 |

* cited by examiner

CLUTCH APPARATUS

The disclosure of the following priority application is herein incorporated by reference:

Japanese Patent Application No. 2018-027011 filed on Feb. 19, 2018.

TECHNICAL FIELD

The present invention relates to a clutch apparatus for use in an automatic transmission provided in a vehicle or the like.

BACKGROUND ART

Automatic transmissions of vehicles perform gear shifting by a transmission mechanism using frictional engagement means such as a clutch or brake. Some conventional clutch apparatuses use a roller one way clutch and a multiplate wet clutch together, which are components of transmission mechanism (see International Application Japanese Translation Laid-open No. 2009-542990 corresponding to WO2008/008268 in the citation list below).

FIG. 5 is a cross sectional view of such a conventional clutch apparatus 101, which is taken along its center axis to show relevant parts.

The clutch apparatus 101 includes a roller one way clutch 103 and a multiplate wet clutch 105 connected to the same planetary carrier (not shown). The roller one way clutch 103 includes an outer race 107, an inner race 109, and rollers 121. The multiplate wet clutch 105 has a plurality of friction plates 110 and a plurality of separator plates 112. The roller one way clutch 103 allows the rotation of the inner race 109 only in one direction and locks the rotation in the other direction. The multiplate wet clutch 105 acts as a braking part that locks the rotation of the inner race 109 in one and the other directions by frictional engagement of the friction plates 110 and the separator plates 112 caused by a piston 114.

CITATION LIST

Patent Document

Patent Document 1: International Application Japanese Translation Laid-open No. 2009-542990 corresponding to WO2008/008268

SUMMARY OF INVENTION

Technical Problem

There are demands for clutch apparatuses with reduced required installation space and weight while having the same functions as conventional clutch apparatuses. If a multiplate wet clutch is used as a component in a transmission mechanism, plates will be bulky, and additional components for gear shift control are required to achieve engagement and disengagement of plates. This leads to difficulty in installation in a reduced space and increase in weight.

The present invention has been made in view of the above circumstances, and an object of the present invention is to provide a clutch apparatus that can be installed in a reduced space while achieving weight reduction.

Solution to Problem

To solve the above problem, according to the present invention, there is provided a clutch apparatus comprising: a first race, a second race differing in diameter from said first race and arranged coaxial with and rotatable relative to said first race, an engagement mechanism provided between said first race and said second race for engagement of said first race and said second race, said engagement mechanism comprising a first clutch allowing rotation of said first race in only one direction, and a second clutch arranged axially adjacent to said first clutch, said second clutch comprising a rotary member that is provided on the second race in a rotatable and axially immovable manner and a movable member that is movable in the axial direction, and a cam mechanism disposed between said rotary member and said movable member, and said movable member being engaged with said first race by being moved in the axial direction by said cam mechanism.

The present invention can provide a clutch apparatus that can be installed in a reduced space and decreased in weight by elimination of components needed in conventional apparatuses.

EMBODIMENT FOR CARRYING OUT THE INVENTION

Figure 1:
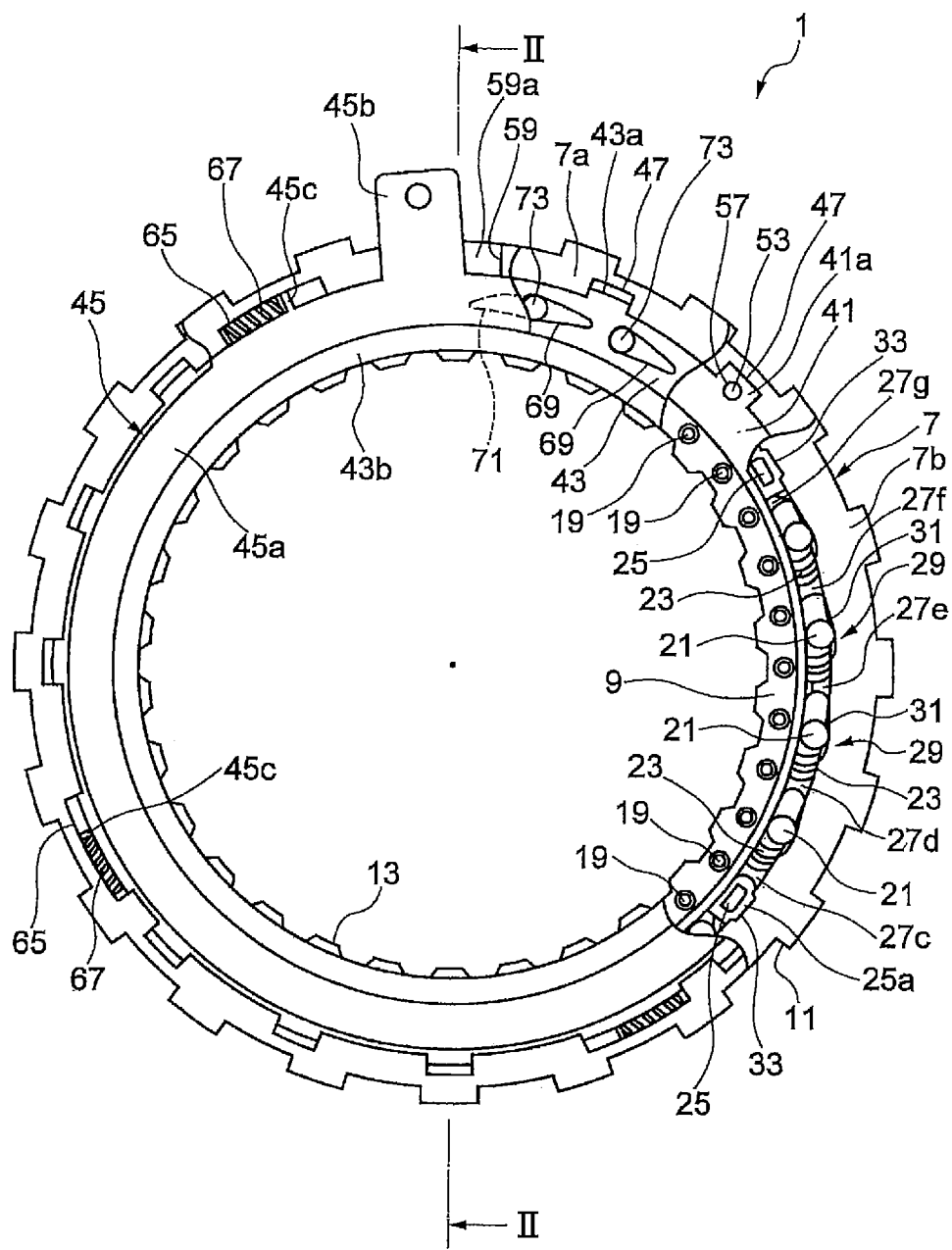
FIG. 1 is a partly cut-away front view of a clutch apparatus according to an embodiment, where a roller one way clutch is shown in an engaging state.

In the following, a clutch apparatus according to an embodiment of the present invention will be described with reference to the accompanying drawings.

Before the description, some terms relating to directions about the clutch apparatus according to the embodiment will be defined. In the description of the embodiment, the term "center axis" refers to the center axis of the clutch apparatus, and the terms "axial direction", "radial direction", and "circumferential direction" respectively refer to the axial direction, radial direction, and circumferential direction with respect to that center axis. As to the axial direction, the term "first axial side" refers to the front side of the plane of the drawing sheets of FIGS. 1 and 3 (namely, the side facing the viewer of FIGS. 1 and 3), and the term "second axial side" refers to the back side of the plane of the drawing sheets of FIGS. 1 and 3 (namely, the side facing away from the viewer of FIGS. 1 and 3). In FIGS. 2 and 4, the left side is the first axial side, and the right side is the second axial side. As to the circumferential directions, the right-hand turning direction on the drawing sheets of FIGS. 1 and 3 will be referred to as the first circumferential direction or the clockwise direction, and the left-hand turning direction on the drawing sheets of FIGS. 1 and 3 will be referred to as the second circumferential direction or the anticlockwise direction.

Figure 2:
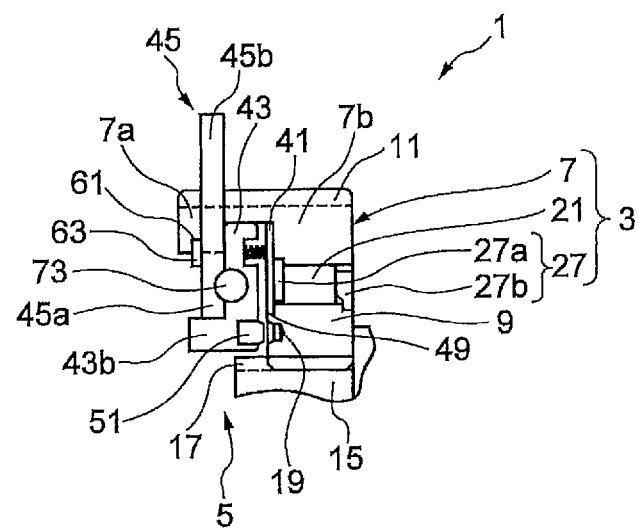
FIG. 2 is a cross sectional view taken along line II-II in FIG. 1.
Figure 2:
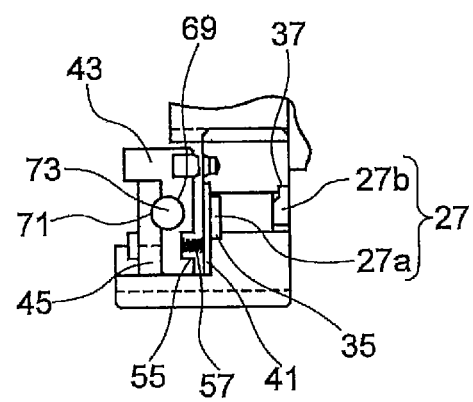

FIG. 1 is a partly cut-away front view of the clutch apparatus according to the embodiment, where a roller one way clutch is shown in an engaging state.

FIG. 2 is an axial cross sectional view of the clutch apparatus according to the embodiment taken along line II-II in FIG. 1.

Figure 3:
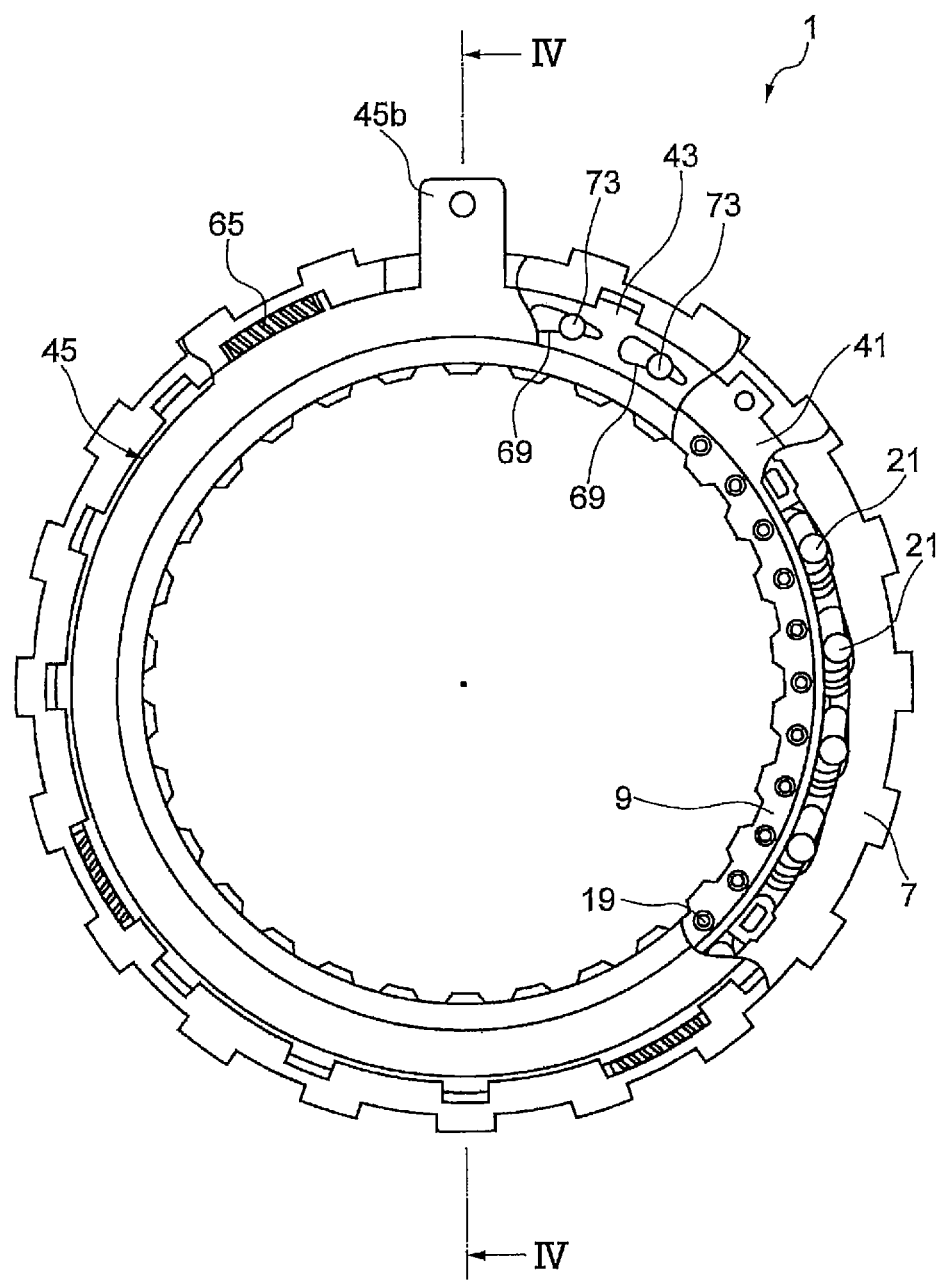
FIG. 3 is a partly cut-away front view of the clutch apparatus according to the embodiment, where a cam clutch and the roller one way clutch are in a coupled state.
Figure 4:
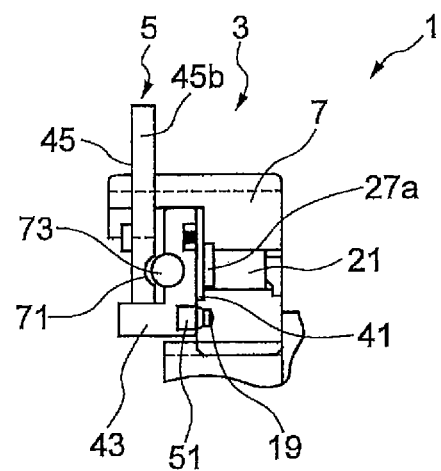
FIG. 4 is a cross sectional view taken along line IV-IV in FIG. 3.
Figure 4:
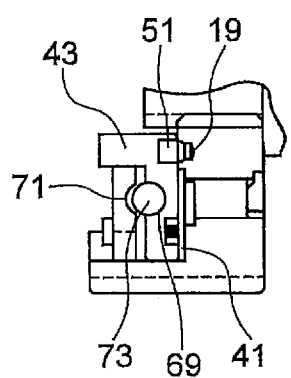
Figure 5:
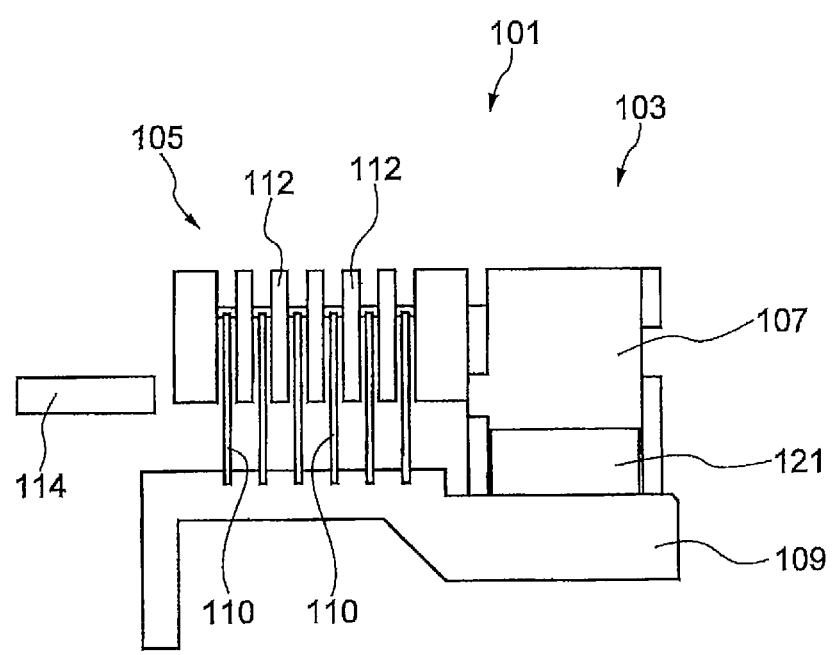
FIG. 5 is a cross sectional view of a conventional clutch apparatus.

FIG. 3 is a partly cut-away front view of the clutch apparatus according to the embodiment, where a cam clutch and the roller one way clutch are in a coupled state.

FIG. 4 is an axial cross sectional view of the clutch apparatus according to the embodiment taken along line IV-IV in FIG. 3.

The clutch apparatus 1 according to the embodiment is made up of a roller one way clutch 3 that is a first clutch and a cam clutch 5 that is a second clutch arranged side-by-side along the axial direction. The clutch apparatus 1 as such is used in an automatic transmission provided in a vehicle. For example, the roller one way clutch 3 is connected to a planetary gear mechanism (not shown). In the automatic transmission, the roller one way clutch 3 functions to allow the rotation of an inner race 9 as one race in only one direction and to lock the rotation in the other direction, and the cam clutch 5 acts as a brake that locks the rotation of the inner race 9 of the roller one way clutch 3 in both the directions.

The structure of the roller one way clutch 3 in the clutch apparatus 1 will firstly be described. In the following description, the roller one way clutch 3 will be simply be referred to as the "one way clutch 3".

The one way clutch 3 has an outer race 7 as the other race, and rollers 21, springs 23 and block bearings 25 that are held together by a retainer 27. An inner race 9 is arranged coaxially with and radially inside the outer race 7 and rotatable relative to the outer race 7. The outer race 7 has an axial length larger than the inner race 9. The outer circumference of the outer race 7 is provided with splines 11, which are in engagement with splines provided on the inner circumference of a clutch case (not shown) to fix the outer race 7 to the clutch case in a non-rotatable manner.

The inner circumference of the inner race 3 is provided with splines 13. The splines 13 are in engagement with splines 17 provided on the outer circumference of a shaft member 15. The inner race 9 is, together with the shaft member 15, rotatable relative to the outer race 7. The shaft member 15 is connected to, for example, a planetary gear mechanism (not shown). The first axial side end surface of the inner race 9 is provided with an engaged portion with which the cam clutch 5 engages. In the apparatus according to the embodiment, the engaged portion includes a plurality of recesses 19 that are spaced uniformly along the circumferential direction and recessed toward the second axial side.

The outer race 7 is integrally composed of a first race portion 7a on the first axial side and a second race portion 7b on the second axial side. The inner circumferential surface of the second race portion 7b is radially opposed to the outer circumferential surface of the inner race 9. While the outer diameter of the first race portion 7a is equal to the outer diameter of the second race portion 7b, the inner diameter of the first race portion 7a is larger than the inner diameter of the second race portion 7b. Thus, the first race portion 7a has a shape of a cylinder that extends from the radially outer portion of the first axial side end of the second race portion 7b toward the first axial side. Radially inside the first race portion 7a is provided the cam clutch 5. In the following description, the first race portion 7a of the outer race 7 will be simply referred to as the "outer race 7a", and the second race portion 7b of the outer race 7 will be simply referred to as the "outer race 7b". The expression "outer race 7" will refer to the whole of the outer race 7 including the first race portion 7a and the second race portion 7b.

The one way clutch 3 further includes a plurality of rollers 21 set between the inner race 9 and the outer race 7b, a plurality of coil or accordion springs 23 that bias the rollers 21 in such a direction that brings the rollers 21 into engagement with the inner race 9 and the outer race 7b, block bearings 25, and a resin retainer 27 that retains the rollers 21.

The inner circumferential surface of the outer race 7b is provided with a plurality of cam portions 29 arranged at certain intervals along the circumferential direction. Each cam portion 29 is a recess that is dished radially outwardly from the inner circumferential surface of the outer race 7b. Each cam portion 29 has a cam surface 31 with which the roller 21 engages. The cam surface 31 is a slant surface that is inclined in such a way that its radial distance to the outer circumferential surface of the inner race 9 decreases as it extends from its first circumferential end to its second circumferential end. The roller 21 has a cylindrical shape with its axis oriented parallel to the axial direction of the inner race 9 and the outer race 7b. The roller 21 slides or rolls on the cam surface 31 of the cam portion 29.

The inner circumferential surface of the outer race 7b is provided with a plurality of axially extended grooves 33 arranged at certain intervals along the circumferential direction. In the axially extended groove 33 is fitted a locking projection 25a of the block bearing 25. There are a plurality of block bearings 25 arranged at equal intervals along the circumferential direction, which maintain the radial gap between the inner race 9 and the outer race 7b and hold the inner race 9 and the outer race 7 coaxially.

As shown in FIGS. 1 and 2, the retainer 27 includes a first annular portion 27a on the first axial side, a second annular part 27b on the second axial side, first column portions 27c, second column portions 27d, third column portions 27e, fourth column portions 27f, and fifth column portions 27g. The first column portions 27c, the second column portions 27d, the third column portions 27e, the fourth column portions 27f, and the fifth column portions 27g connect the first annular portion 27a and the second annular portion 27b along the axial direction. There are multiple sets of the first to fifth column portions 27c to 27g arranged all along the circumference of the retainer 27, and the first to fifth column portions 27c to 27g in each set are arranged in order from the first circumferential side to the second circumferential side.

The first annular portion 27a is disposed on the first axial side end of the circumferential space between the inner race 9 and the outer race 7b to close the opening of that circumferential space on its first axial side end. The radially outer edge of the first annular portion 27a abuts on the end surface of an enlarged diameter stepped portion 35 provided on the first axial side end portion of the inner circumferential surface of the outer race 7b. The second annular portion 27b is disposed on the second axial side end of the circumferential space between the inner race 9 and the outer race 7b to close the opening of that circumferential space on its second axial side end. The radially inner edge portion of the second annular portion 27b abuts on the end surface of a reduced diameter stepped portion 37 provided on the second axial side end portion of the outer circumferential surface of the inner race 9. The axial movement of the retainer 27 is prevented by the abutment of the first annular portion 27a on the end surface of the outer race 7b and the abutment of the second annular portion 27b on the end surface of the inner race 9 as above.

The spring 23 is attached to the first column portion 27c. The spring 23 biases the roller 21 disposed between the first column portion 27c and the second column portion 27d to the engaging direction, namely in the second circumferential direction. Likewise, springs 23 are attached to the second to fourth column portions 27d to 27f respectively, and springs 23 bias the roller 21 disposed between the second column portion 27d and the third column portion 27e, the roller 21 disposed between the third column portion 27e and the fourth column portion 27f, and the roller 21 disposed between the fourth column portion 27f and the fifth column portion 27g in the engaging direction.

The roller one way clutch 3 as above allows the inner race 9 to rotate in the first circumferential direction, that is, in the clockwise direction in FIGS. 1 and 3. In that case, the rollers 21 do not engage with the cam surfaces 31 of the cam portions 29, and the inner race 9 rotates relative to the outer race 7b. On the other hand, the rotation of the inner race 9 in the second circumferential direction or in the anticlockwise direction is restricted. In that case, as shown in FIG. 1, the rollers 21 engage with the cam surfaces 31, so that the rotation of the inner race 9 relative to the outer race 7 is restricted.

Next, the structure of the cam clutch 5 in the clutch apparatus 1 will be described.

The cam clutch 5 is disposed radially inside the outer race 7a and adjacent to the first axial side of the one way clutch 3. The cam clutch 5 includes an annular back plate 41 disposed on the first axial side of the one way clutch 3, an annular working plate 43 disposed on the first axial side of the back plate 41, and an annular switching plate 45 disposed on the first axial side of the working plate 43. The back plate 41, the working plate 43, and the switching plate 45 are arranged coaxially about the center axis. The switching plate 45 is caused to act by operation of the working plate 43 to switch coupling and decoupling of the cam clutch 5 with the one way clutch 3, as will be described later.

The inner circumference of the outer race 7a is provided with a plurality of axially extended grooves 47, which are arranged at certain intervals along the circumferential direction. The axially extended groove 47 opens on the first axial side end surface of the outer race 7a and extends therefrom to the first axial side end surface of the outer race 7b. The outer circumference of the back plate 41 is provided with a plurality of engagement projections 41a, which are projecting radially outward and arranged at certain intervals along the circumferential direction. The engagement projections 41a are equal in number to the axially extended grooves 47 on the outer race 7a, and the engagement projections 41a are fitted respectively in the axially extended grooves 47 on the outer race 7a. The second axial side surface of the back plate 41 abuts on the first axial side end surface of the outer race 7b and the first axial side end surface of the first annular portion 27a of the retainer 27. The radially inner edge of the back plate 41 abuts on a reduced diameter stepped portion 49 provided on the first axial side end portion of the outer circumference of the inner race 9. With the above structure, the back plate 41 is fixed to the outer race 7a in a non-rotatable and axially-immovable way.

The working plate 43 has a diameter as large as the diameter of the back plate 41. The outer circumference of the working plate 43 is provided with a plurality of engagement projections 43a, which are projecting radially outward and arranged at certain intervals along the circumferential direction. The engagement projections 43a are equal in number to the axially extended grooves 47 on the outer race 7a, and the engagement projections 43a are fitted respectively in the axially extended grooves 47 on the outer race 7a. The working plate 43 is fitted to the outer race 7a in a non-rotatable and axially-movable way by the fitting of the engagement projections 43a in the axially extended grooves 47 of the outer race 7a. The radially inner portion of the working plate 43 is provided with a cylindrical portion 43b that projects to the first axial side.

The second axial side end surface of the working plate 43 is axially opposed to the first axial side surface of the back plate 41 and the first axial side end surface of the inner race 9. The second axial side end surface of the working plate 43 is provided with engagement portions that are to engage with the plurality of recesses 19 formed on the first axial side end surface of the inner race 9. The engagement portions in this embodiment are a plurality of pins 51 provided on the working plate 43 and projecting from the working plate 43 to the second axial side. The cam clutch 5 is coupled to the one way clutch 3 by the engagement of the pins 51 with the respective recesses 19, which are engagement portions provided on the inner race 9. The number of the pins 51 is a design choice. The coupling operation of the cam clutch 5 and the one way clutch 3 will be described later.

The first axial side surface of the back plate 41 is provided with a plurality of projections 53, which are arranged at equal intervals along the circumferential direction. The second axial side surface of the working plate 43 is provided with a plurality of recesses 55, which are arranged at equal intervals along the circumferential direction. The projections 53 on the back plate 41 and the recesses 55 on the working plate 43 are equal in number and axially opposed to each other. A compressed coil spring 57 is provided between each projection 53 and each recess 55. Thus, the working plate 43 is biased toward the first axial side by a plurality of springs 57.

The switching plate 45 includes an annular portion 45a and a lever portion 45b projecting radially outwardly from the outer circumference of the annular portion 45a. The annular portion 45a is axially opposed to the working plate 43. The annular part 45a is disposed between the inner circumferential surface of the outer race 7a and the outer circumferential surface of the cylindrical portion 43b of the working plate 43. The outer circumferential surface of the annular portion 45a can slide on the inner circumferential surface of the outer race 7a and the inner circumferential surface of the annular portion 45a can slide on the outer circumferential surface of the cylindrical portion 43b of the working plate 43. Thus, the switching plate 45 is rotatable about the center axis relative to the outer race 7a and the working plate 43.

The outer race 7a is provided with a cut portion 59 that passes through the outer race 7a in the radial direction, extends in the axial direction and opens on the first axial side end surface. The cut portion 59 extends to the axially central portion of the outer race 7a. In other word, the bottom 59a of the cut portion 59 is located in the axially central portion of the outer race 7a. The circumferential dimension of the cut portion 59 is larger than the circumferential dimension of the lever portion 45b of the switching plate 45. The lever portion 45b passes through the cut portion 59 along the radial direction and extends radially outward beyond the outer circumference of the outer race 7a. The above structure allows the switching plate 45 to rotate about the center axis relative to the outer race 7a and the working plate 43 within the range of circumferential movement of the lever portion 45b in the cut portion 59. In other words, the two circumferentially opposed surfaces that define the cut portion 59 regulate the range of rotation of the switching plate 45.

The lever portion 45b of the switching plate 45 abuts on the bottom 59a of the cut portion 59. Thus, the bottom 59a of the cut portion 59 restricts the movement of the switching plate 45 toward the second axial side. The inner circumference of the outer race 7a is formed with a groove 61 that extends all along the circumference, in which a retaining ring 63 is fitted. The first axial side surface of the annular portion 45a of the switching plate 45 is in contact with the second axial side surface of the retaining ring 63. The switching plate 45 is prevented from moving in the axial direction by the abutment of the lever portion 45b on the bottom 59a of the cut portion 59 and by the contact of the first axial side surface of the lever portion 45b with the retaining ring 63. The working plate 43 is axially movable between the switching plate 45 and the back plate 41.

The inner circumference of the outer race 7a is formed with a plurality of circumferential grooves 65 having a certain length, which are arranged at equal intervals along the circumferential direction at positions opposed to the outer circumferential surface of the annular portion 45a of the switching plate 45. There are four circumferential grooves 65 in this embodiment. The outer circumference of the annular portion 45a of the switching plate 45 is integrally provided with pawls 45c at positions opposed to the respective circumferential grooves 65 of the outer race 7a. The pawls 45c project into the respective corresponding circumferential grooves 65. A lever spring 67 is provided between each pawl 45c and the second circumferential side wall of each circumferential groove 65. Thus, the switching plate 45 is rotationally biased by the lever springs 67 through the pawls 45c in the second circumferential direction, namely in the anticlockwise direction.

Next, the cam mechanism of the cam clutch 5 will be described.

The first axial side surface of the working plate 43 is formed with a plurality of cam grooves 69, which are arranged at equal intervals along the circumferential direction. The cam groove 69 extends along the circumferential direction. When seen from the first axial side, the radial width (i.e. the width along the radial direction) of the cam groove 69 increases along the circumferential direction from the first circumferential side toward the second circumferential side. Thus, when seen from the first axial side, the contour of the cam groove 69 has a teardrop shape.

The second axial side surface of the annular portion 45a of the switching plate 45 is provided with a plurality of cam grooves 71, which are arranged at equal intervals along the circumferential direction. The cam grooves 71 of the switching plate 45 are equal in number to the cam grooves 69 of the working plate 43 and axially opposed to the respective cam grooves 69 of the working plate 43. The cam groove 71 of the switching plate 45 has the same structure as the cam groove 69 of the working plate 43 with the same depth, width, and circumferential length. However, the cam groove 71 of the switching plate 45 is oriented in the reverse direction to the cam groove 69 of the working plate 43 along the circumferential direction. In other words, when seen from the first axial side as shown in FIG. 1, the radial width of the cam groove 71 of the switching plate 45 decreases along the circumferential direction from the first circumferential side toward the second circumferential side.

A ball 73 is provided between each cam groove 69 of the working plate 43 and each cam groove 71 of the switching plate 45. The ball 73 rolls in both the cam groove 69 of the working plate 43 and the cam groove 71 of the switching plate 45. The diameter of the ball 73 is approximately twice the depth (or axial dimension) of the cam groove 69 and a little smaller than the largest width of the cam groove 69 in the radial direction. Hence, when the ball 73 is located in the largest radial width portion of the groove 69, the ball 73 is in contact with the bottom of the cam groove 69, and as the ball 73 rolls on the cam groove 69 in the direction of decreasing radial width, the ball 73 rolls on the edges of the cam groove 69 and is detached from the bottom of the cam groove 69. As the ball 73 moves in the direction of decreasing radial width of the cam groove 69, the distance between the ball 73 and the bottom of the cam groove 69 increases. The above is also the case when the ball 73 rolls on the cam groove 71 of the switching plate 45.

A cam mechanism is constituted by the cam grooves 71 of the switching plate 45, the cam grooves 69 of the working plate 43, and the balls 73 provided between the cam grooves 71, 69 as described above. The cam clutch 5 is coupled to and decoupled from the one way clutch 3 by the operation of the cam mechanism. In other words, the clutch apparatus 1 is engaged and disengaged by the operation of the cam mechanism. Next, the operation of the clutch apparatus 1 according to the present embodiment will be described.

The clutch apparatus 1 according to the present embodiment causes the working plate 43 to move by rotating the switching plate 45 about the center axis, thereby coupling and decoupling the roller one way clutch 3 and the cam clutch 5. The switching plate 45 is rotated by moving the lever portion 45b in the circumferential direction by an actuator that is not shown in the drawings.

In the state shown in FIGS. 1 and 2, since the switching plate 45 is biased in the anticlockwise direction relative to the outer race 7 by the lever springs 67, the lever portion 45b is located at the second circumferential side end in the cut portion 59. In this state, the largest radial width portion of each cam groove 69 of the working plate 43 and the largest radial width portion of each cam groove 71 of the switching plate 45 are opposed to each other, and the ball 73 is located in those portions of the cam grooves 69, 71. The ball is in contact with bottom of both cam grooves 69, 71.

The working plate 43 is biased by the springs 57 toward the first axial side. Thus, the working plate 43 is located at the first axial side end of its movable range and pressed against the second axial side surface of the switching plate 45. In this state, as shown in FIG. 2, the pins 51 as the engagement portions on the working plate 43 are not in engagement with the recesses 19 as the engagement portions on the inner race 9. Hence, the cam clutch 5 is not coupled with the one way clutch 3.

In this state, the inner race 9 of the one way clutch 3 can rotate in the clockwise direction, while the rotation in the anticlockwise direction is prevented. Thus, the one way clutch 3 functions as a backstop that allows the rotation of the inner race 9 in one direction and prevents the rotation of the inner race 9 in the other direction.

When the actuator (not shown) operates in the state shown in FIGS. 1 and 2 to move the lever portion 45b of the switching plate 45 in the first circumferential direction, the switching plate 45 rotates in the clockwise direction. In consequence, the cam grooves 71 of the switching plate 45 moves in the clockwise direction, so that the balls 73 roll in both the cam grooves 71 and the cam grooves 69 of the working plates 43. More specifically, each ball 73 rolls in the cam groove 71 of the switching plate 45 from the largest radial width portion in the direction of decreasing radial width. Likewise, each ball 73 rolls in the cam groove 69 of the working plate 43 from the largest radial width portion in the direction of decreasing radial width.

Since the axial movement of the switching plate 45 is restricted, as the balls 73 roll in the respective cam grooves 71 of the switching plate 45 in the direction of decreasing radial width, their distance from the bottom of the cam grooves 71 increases. Thus, the balls 73 move toward the second axial side. As the balls 73 move toward the second axial side in this way, they push the working plate 43 relative to the switching plate 45 toward the second axial side while resisting the biasing force of the springs 57. Moreover, since the balls 73 roll in the cam grooves 69 of the working plate 43 in the direction of decreasing radial width, the distance between the balls 73 and the bottom of the cam grooves 69 increases gradually, so that the working plate 43 moves greatly toward the second axial side.

As the working plate 43 moves toward the second axial side, the pins 51 on the working plate 43 come into engagement with the recesses 19 on the inner race 9. When the lever portion 45b of the switching plate 45 is located at the first circumferential side end of the cut portion 59, the rotation of the switching plate 45 is restricted. In this state, as shown in FIG. 4, the working plate 43 abuts on the back plate 41, and the pins 51 on the working plate 43 are in full engagement with the recesses 19 on the inner race 9. Thus, the cam clutch 5 is coupled to the one way clutch 3, and the clutch apparatus 1 is engaged. In this state, the small radial diameter portion of each cam groove 69 of the working plate 43 and the small radial diameter portion of each cam groove 71 of the switching plate 45 are opposed to each other, and the ball 73 is in contact with the bottom of neither cam groove 69, 71.

In this state, the rotation of the inner race 9 in the clockwise direction and the rotation in the anticlockwise direction are both prevented. Thus, the cam clutch 5 acts as a brake that prevents the rotation of the inner race 9 in both direction.

When the actuator (not shown) operates again to move the lever portion 45b of the switching plate 45 toward the second circumferential side end of the cut portion 59, the each ball 73 moves in both the cam grooves 69, 71 in the direction from the smaller radial width side toward the larger radial width side. In consequence, the working plate 43 moves toward the first axial side by the biasing force of the springs 57. Consequently, the pins 51 on the working plate 43 are disengaged from the recesses 19 on the inner race 9, so that the clutch apparatus 1 is disengaged.

As above, the clutch apparatus 1 according to the embodiment uses the cam clutch 5 using the balls 73 as a brake that restricts the rotation of the inner race 9 of the one way clutch in both directions. The cam clutch 5 is smaller in axial dimension than conventional multiplate wet clutches. Therefore, the clutch apparatus 1 can be installed in a reduced space while having functions the same as conventional clutch apparatuses. Moreover, the clutch apparatus 1 does not need to be provided with additional components like those required for the purpose of gear shift operation in multiplate wet clutches using a plurality of frictionally engaging plates. Therefore, it is possible to provide a clutch apparatus that can be reduced in weight.

The clutch apparatus 1 according to the present invention is not limited to the above-described embodiment, and modifications can be made thereto. While in the above embodiment the cam surfaces 31 of the roller one way clutch 3 are provided on the inner circumferential surface of the outer race 7, they may be provided on the outer circumferential surface of the inner race 9. The roller one way clutch 3 used in the above embodiment may be replaced by a sprag one way clutch or a ratchet one way clutch.

In the above embodiment, the one way clutch 3 has the fixed outer race 7 and the rotary inner race 9, and the cam clutch 5 restricts the rotation of the inner race 9. Alternatively, the one way clutch may have a fixed inner race and a rotary outer race, and the cam clutch may restrict the rotation of the outer race. In that case, the working plate and the switching plate are provided on the inner race.

The clutch apparatus 1 according to the embodiment can be used in various apparatuses besides the automatic transmission for a vehicle.

REFERENCE SINGS LIST

1: clutch apparatus
3: roller one way clutch
5: cam clutch
7: outer race
9: inner race
21: roller
25: block bearing
27: retainer
29: cam portion
31: cam surface
41: back plate
43: working plate
45: switching plate
45a: lever portion
47: axial groove
51: pin
57: spring
59: cut portion
59a: bottom
65: circumferential groove
67: lever spring
69: cam groove
71: cam groove
73: ball

What is claimed is:

1. A clutch apparatus comprising:
a first race,
a second race differing in diameter from said first race and arranged coaxial with and rotatable relative to said first race,
an engagement mechanism provided between said first race and said second race for engagement of said first race and said second race,
said engagement mechanism comprising a first clutch allowing rotation of said first race in only one direction, and a second clutch arranged axially adjacent to said first clutch,
said second clutch comprising a rotary member that is provided on the second race in a rotatable and axially immovable manner and a movable member that is movable in the axial direction, and a cam mechanism disposed between said rotary member and said movable member, and
said movable member being engaged with said first race by being moved in the axial direction by said cam mechanism.

2. The clutch apparatus according to claim 1, wherein said second clutch restricts rotation of said first race in one and the other directions by engagement of said movable member with said first race.

3. The clutch apparatus according to claim 1, wherein said movable member comprises an annular member axially opposed to said first race, and said rotary member comprises an annular member opposed to said movable member on the side opposite to said first race.

4. The clutch apparatus according to claim 3, wherein said cam mechanism comprises:
a plurality of first cam grooves provided on a surface of said movable member opposed to said rotary member;

a plurality of second cam grooves provided on a surface of said rotary member opposed to said movable member, said plurality of second cam grooves being opposed to said plurality of first cam grooves respectively; and rolling members provided between said first cam grooves and said second cam grooves opposed to each other.

5. The clutch apparatus according to claim 4, wherein said first cam groove extends along the circumferential direction and has a radial width that increases from one circumferential side toward the other circumferential side, and said second cam groove extends along the circumferential direction and has a radial width that decreases from one circumferential side toward the other circumferential side.

6. The clutch apparatus according to claim 5, wherein as said rotary member rotates in one circumferential direction, each of said rolling members rolls in the direction of decreasing radial width on both said first and second cam grooves.

7. The clutch apparatus according to claim 4, wherein as said rolling members move relative to said first and second cam grooves, said movable member moves in the axial direction.

8. The clutch apparatus according to claim 1, wherein said engagement mechanism comprises a plurality of rollers disposed between said first race and said second race and a plurality of cam surfaces provided on the first or second race with which said plurality of rollers engage respectively.

9. The clutch apparatus according to claim 2, wherein said movable member comprises an annular member axially opposed to said first race, and said rotary member comprises an annular member opposed to said movable member on the side opposite to said first race.

10. The clutch apparatus according to claim 9, wherein said cam mechanism comprises:
a plurality of first cam grooves provided on a surface of said movable member opposed to said rotary member;
a plurality of second cam grooves provided on a surface of said rotary member opposed to said movable member, said plurality of second cam grooves being opposed to said plurality of first cam grooves respectively; and
rolling members provided between said first cam grooves and said second cam grooves opposed to each other.

11. The clutch apparatus according to claim 10, wherein said first cam groove extends along the circumferential direction and has a radial width that increases from one circumferential side toward the other circumferential side, and said second cam groove extends along the circumferential direction and has a radial width that decreases from one circumferential side toward the other circumferential side.

12. The clutch apparatus according to claim 11, wherein as said rolling members move relative to said first and second cam grooves, said movable member moves in the axial direction.

13. The clutch apparatus according to claim 11, wherein as said rotary member rotates in one circumferential direction, each of said rolling members rolls in the direction of decreasing radial width on both said first and second cam grooves.

14. The clutch apparatus according to claim 13, wherein as said rolling members move relative to said first and second cam grooves, said movable member moves in the axial direction.

15. The clutch apparatus according to claim 10, wherein as said rolling members move relative to said first and second cam grooves, said movable member moves in the axial direction.

16. The clutch apparatus according to claim 9, wherein said engagement mechanism comprises a plurality of rollers disposed between said first race and said second race and a plurality of cam surfaces provided on the first or second race with which said plurality of rollers engage respectively.

17. The clutch apparatus according to claim 2, wherein said engagement mechanism comprises a plurality of rollers disposed between said first race and said second race and a plurality of cam surfaces provided on the first or second race with which said plurality of rollers engage respectively.

* * * * *